US011105460B1

(12) United States Patent
Smith et al.

(10) Patent No.: US 11,105,460 B1
(45) Date of Patent: Aug. 31, 2021

(54) POST MOUNT

(71) Applicants: Jack Smith, Cullman, AL (US); Jason Goolsby, Cullman, AL (US)

(72) Inventors: Jack Smith, Cullman, AL (US); Jason Goolsby, Cullman, AL (US)

(*) Notice: Subject to any disclaimer, the term of this patent is extended or adjusted under 35 U.S.C. 154(b) by 0 days.

(21) Appl. No.: 16/805,548

(22) Filed: Feb. 28, 2020

(51) Int. Cl.
*F16M 13/02* (2006.01)
*A01K 31/14* (2006.01)
*E04H 17/20* (2006.01)

(52) U.S. Cl.
CPC ............ *F16M 13/02* (2013.01); *A01K 31/14* (2013.01); *E04H 17/20* (2013.01)

(58) Field of Classification Search
CPC ......... E04H 17/20; A01K 31/14; F16M 13/02
USPC ............................................. 248/218.4, 534
See application file for complete search history.

(56) References Cited

U.S. PATENT DOCUMENTS

| | | | | |
|---|---|---|---|---|
| 1,748,349 A * | 2/1930 | Ijams | ..................... | A01K 31/14 |
| | | | | 119/432 |
| 1,915,535 A * | 6/1933 | Johnson | .............. | E04H 12/2215 |
| | | | | 52/153 |
| 4,077,611 A * | 3/1978 | Wilson | ................... | A01K 3/005 |
| | | | | 174/163 F |
| 5,085,409 A * | 2/1992 | Teixeira | .................. | E04H 17/12 |
| | | | | 174/158 F |
| 5,224,241 A * | 7/1993 | Williams | .............. | E05D 5/0215 |
| | | | | 16/253 |
| 6,247,553 B1 * | 6/2001 | Jones | ........................ | E06C 9/04 |
| | | | | 182/92 |
| 6,481,696 B1 * | 11/2002 | Lion | ...................... | A01G 17/06 |
| | | | | 256/11 |
| 6,619,627 B2 * | 9/2003 | Salisbury | ................. | A01K 3/00 |
| | | | | 256/1 |
| D503,834 S * | 4/2005 | Fusaro | ......................... | D30/119 |
| 7,694,447 B1 * | 4/2010 | Rutler | ..................... | G09F 7/002 |
| | | | | 40/654.01 |
| 8,646,735 B2 * | 2/2014 | Bradley | .............. | E04H 12/2253 |
| | | | | 248/121 |
| 10,697,947 B1 * | 6/2020 | Armitage | ................ | H02S 20/20 |
| 2014/0263898 A1 * | 9/2014 | Aldrich | ................... | E04H 17/20 |
| | | | | 248/219.2 |
| 2016/0290552 A1 * | 10/2016 | Holestine | ............... | F16M 13/02 |
| 2019/0352927 A1 * | 11/2019 | Xue | ..................... | E04H 17/1421 |
| 2020/0232959 A1 * | 7/2020 | Armitage | ................ | H02S 20/10 |
| 2020/0333307 A1 * | 10/2020 | Armitage | .............. | A01K 31/14 |

FOREIGN PATENT DOCUMENTS

FR          2710237 A1 *    3/1995    ............ A01K 31/14

* cited by examiner

*Primary Examiner* — Eret C McNichols
(74) *Attorney, Agent, or Firm* — Dennen IP Law, LLC

(57) ABSTRACT

The present disclosure is a post mount that has a fence post with a protrusion that expands a length of the fence post. Further, the post mount has a support stud that has one or more openings for receiving one or more fasteners and slot originating at a bottom of the support stud and terminating before the top of the support stud. The slot goes through the support stud from a front of the support stud and opening in a back of the support stud. The slot receives the protrusion.

17 Claims, 5 Drawing Sheets

POST MOUNT

BACKGROUND

A t-post is a type of post or picket that are often used for fencing. The t-posts are typically fabricated out of steel and are configured to support wire or wire mesh. In use, the t-post is driven into the ground either manually or with a pneumatic post pounder.

Along the post is a spine, and the spine may comprise studs or nubs. In this regard, the nubs or studs prevent barbed wire or mesh from sliding up or down the post.

In addition to t-posts, there are also u-posts, y-posts, or other shaped posts. Regardless of the shape, each is designed to couple to wire or mesh.

On farms throughout the United States farmers use t-posts to build their fences. There are hundreds of thousands of t-posts on farms throughout the United States.\

BRIEF DESCRIPTION OF THE FIGURES

The present disclosure can be better understood with reference to the following drawing figures. The elements of the drawing figures are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure is an exemplary t-post mount in accordance with an embodiment of the present disclosure. The exemplary t-post mount couples to a t-post. The t-post mount comprises a support stud that couples to the t-post. The support stud extends upwardly from the t-post. At a top end of the support stud, that extends upwardly from the t-post, is a surface to which various implements can be mounted.

The support stud may be rectangular. However, it may be other shapes in other embodiments. Extending from the bottom of the support stud is a slot that extends upwardly and terminates prior to the section of the support stud to which the implement is mounted. Note that the slot in the support stud runs from a front of the support stud to a back of the support stud leaving the slot vacuous.

The support stud attaches to the t-post. Notably, the t-post is a is a steel rod having a t-shaped cross-section. In this regard. The t-shaped t-post comprises a spine that extends the length of the rod, and contiguous with and jutting outward from either side of the spine are wings. The support stud is mounted to the t-post by sliding the spine of the t-post upward through the support stud slot until the spine reaches then end of the length of the slot. Thus, the support stud is retained by and coupled to the t-post.

In one embodiment, a person may desire to mount a birdhouse to the support stud, which is mounted to the t-post. In the embodiment, the birdhouse is coupled to an upper portion of the support side via fasteners. Some exemplary fasters may include nails, staples, or the like. While the present disclosure uses a birdhouse as an exemplary implement, of the implements may be coupled to the support stud in other embodiments.

Figures 1, 2, 3:
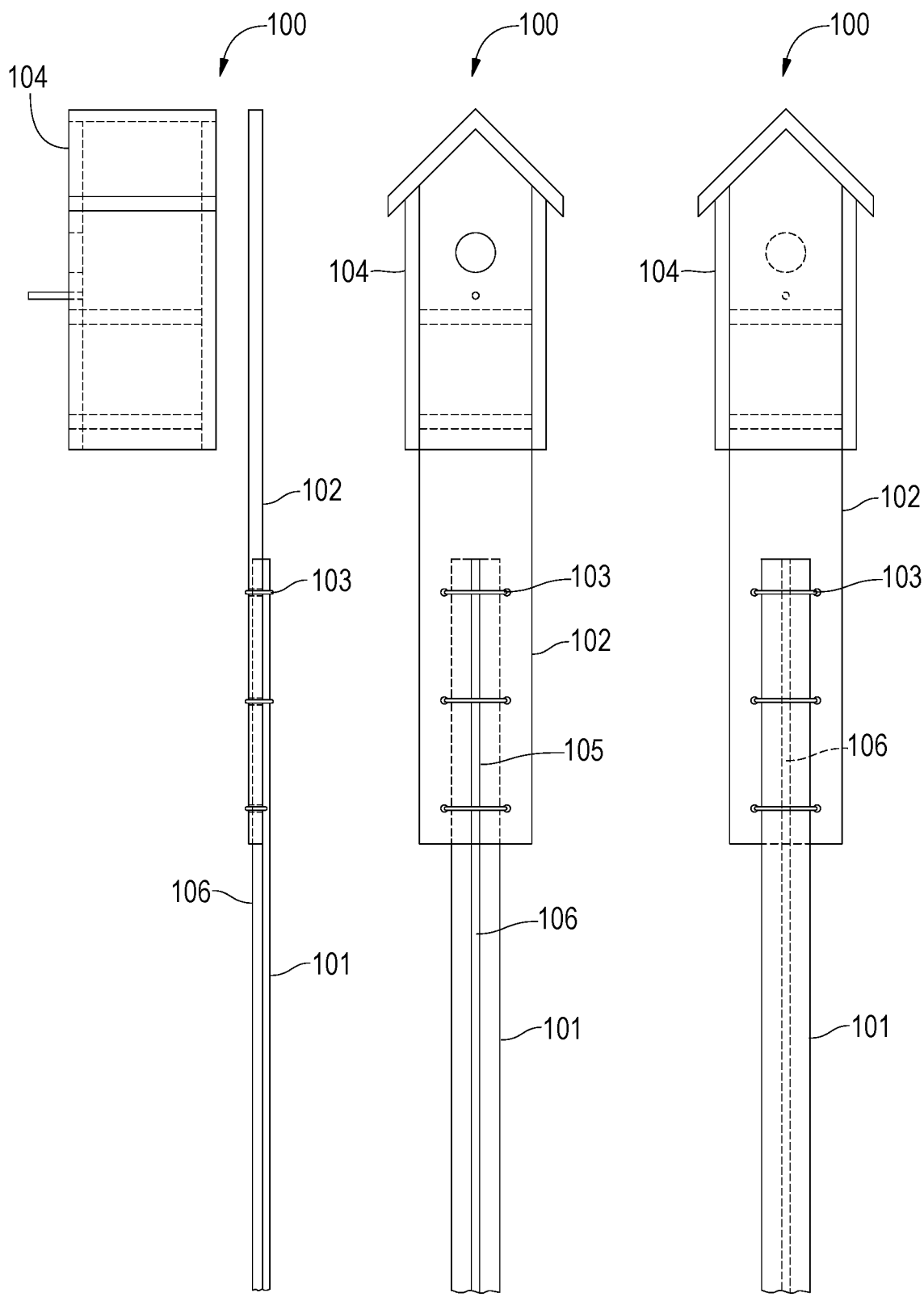
FIG. 1 is a side view of an exemplary t-post mount in accordance with an embodiment of the present disclosure showing a birdhouse detached from the t-post mount.
FIG. 2 is a front view of the exemplary t-post mount shown in FIG. 1 with the birdhouse attached thereto.
FIG. 3 is a back view of the exemplary t-post mount shown in FIG. 1 with the birdhouse attached thereto.

FIG. 1 is a side view of an exemplary t-post mount 100 in accordance with an embodiment of the present disclosure. The view shows a detached birdhouse 104 that may be coupled to the t-mount post. Note, however, that other implements may be attached to the t-post mount 100 in other embodiments.

The t-post mount 100 comprises a support stud 102. The support stud 102 may be made of any type of material known in the art or future developed. For example, the support stud may be comprised of wood, metal, plastic, etc. The birdhouse 104 is coupled at a top end of the support stud 102 via fasteners, e.g., nails or screws.

The support stud 102 is coupled to the t-post 108 on a bottom end of the support stud 102. In this regard, the t-post mount 100 comprises a t-post 108. The t-post 108 comprises wings 101. Protruding from the wings 101 is a spine 106 that traverses the length of the t-post 108.

The support stud 102 comprises a flat surface 110 for receiving an implement (e.g., the birdhouse 104) and coupling thereto via fasteners (not shown), such as nails or screws. The support stud 102 further comprises a slot (shown in FIG. 2). The slot is configured and arranged to receive the spine 106. Accordingly, to mount the support stud 102 to the t-post 108, one inserts the spine 106 into the slot and slides the spine 106 up through the slot until the slot terminates.

Once the spine 106 has been inserted in the slot, further attachment means may be used in some embodiments to secure the spine 106 to the support stud 102. In this regard, wires ties 103 may be used to further secure the spine 106 to the support stud 102. Notably, the wire ties 103 insert through openings (not shown) in the support stud 102, circle back around the support stud 102 and attach. Note that wire ties 103 are shown; however other types of fasteners may be used in other embodiments. Also, three wire ties 103 are shown in FIG. 1. However, fewer or more wire ties 103 may be used in other embodiments.

FIG. 2 is a view of the exemplary t-post mount 100 shown in FIG. 1 with the birdhouse 104 attached thereto. Note that while a birdhouse 104 is shown attached to the t-post 100, other implements may be attached to the t-post mount 100 in other embodiments.

The t-post mount 100 comprises the support stud 102 and the t-post 101. The support post 102 mounts to the t-post 108. Thus, the birdhouse 104, or other implement, is indirectly mounted to the t-post 108 via the support stud 102.

The support stud 102 shown in FIG. 2 is substantially rectangular. However, the support stud 102 may be different shapes in other embodiments. Notably, the support stud 102 has a flat surface 110 (FIG. 1) to which the birdhouse or other implement may be mounted. Also, the support stud 102 is fixedly and rigidly coupled the t-post 108 on a back side of the support stud 102. That is, the birdhouse 104 is coupled to a from of the support stud 102, and the back side of the support stud 102 is coupled to the t-post 108.

Further, the support stud 102 comprises a slot 105. The slot 105 extends from the bottom of the support stud 102 and upward toward the mounted birdhouse 104 or another mounted implement. The slot 105 terminates prior to reaching the mounted birdhouse 104 or another mounted implement.

The t-post 108 comprises a spine 106. On each side of the spine 106 is a wing 101. The spine 106 protrudes from the wings 101.

The spine 106 slidably inserts into the slot 105. In this regard, the slot 105 is a size suitable for receiving the spine 105 and coupling thereto.

In addition, the t-post mount 100 comprises a plurality of fasteners that fasten the support stud 102 to the t-post 108. In one embodiment, the fasteners that fasten the support stud 102 to the t-post 108 are wire ties 103. Notably, the wire ties insert through openings in the support stud 102, circle back around the support stud 102 and attach. Note that wire ties 103 are merely exemplary, and any type of fastener may be used to fasten the support stud 102 to the t-post 108. Note that the support stud 102 comprises openings (not shown) for inserting the fasteners to fasten the support stud 102 to the t-post 108.

The t-post mount 100 of FIG. 2 comprises the birdhouse 104. In this embodiment, the t-post mount 100 allows a person to attract birds to their property. Further, because the birdhouse 104 is substantially off the ground, it is difficult for undesirable animals to access the birdhouse 104.

FIG. 3 is a back view of the exemplary t-post mount 100 shown in FIG. 1 with the birdhouse 104 attached thereto. The support stud 102 is fixedly and rigidly coupled on its front side to a birdhouse 104 or another mounted implement.

On the back side of the t-post mount 100, the support stud 102 is coupled to the t-post 108. As noted herein, the t-post 108 comprises a spine 106 and a pair of wings 101 extending perpendicularly from the spine 106. Thus, the spine 106 protrudes out from the wings 101.

The spine 106 that protrudes from the wings 101 slidably couples with the slot 105 (FIG. 2). Once the spine 106 is fully inserted into the slot 105, fasteners are mounted around the t-post and openings (not shown) in the support stud 102 to fixedly and rigidly coupled the support stud 102 to the t-post 108. In one embodiment, these fasteners are wire ties; however, other fasteners or other types of fasteners may be used in other embodiments. Notably, the wire ties insert through openings in the support stud 102, circle back around the support stud 102 and attach.

Figure 4:
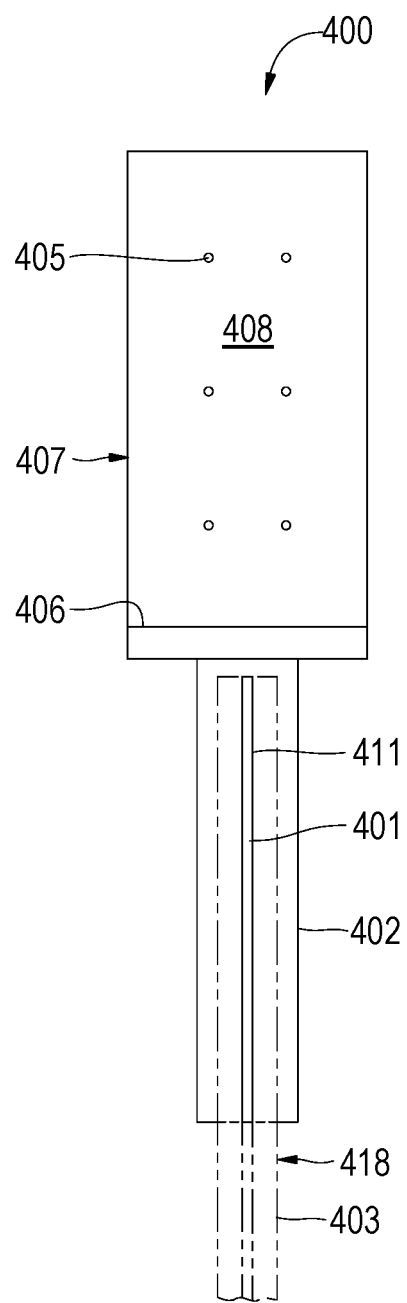
FIG. 4 is a front view of another embodiment of an t-post mount having a support ledge in accordance with an embodiment of the present disclosure.

FIG. 4 is a front view of another embodiment of an t-post mount 400 having a support ledge 406 in accordance with an embodiment of the present disclosure. In this regard, the t-post mount 400 comprises a support stud 406. The support stud 406 comprises a plurality of openings 405 for receiving fasteners, e.g., nails or screws, to mount an implement on a flat surface 408 of the support stud 407.

The support stud 406 further comprises a ledge 406. The ledge 406 extends perpendicularly to the flat surface 408 of the support stud 407. The ledge 406 is configured to receive and support an implement, e.g., a back, bottom edge of a birdhouse 104 (FIG. 3).

The support stud 407 further comprises a leg 402 that extends from the ledge 406. The leg 402 of the support stud 407 comprises a slot 411. The slot 411 extends from a bottom of the support stud 407 and terminates before reaching the ledge 406.

The t-post mount 400 further comprises a t-post 418. The t-post 418 comprises a spine 401 that extends the length of the t-post 418. The support stud 407 is coupled to the t-post 418 on a bottom end of the support stud 407. In this regard, the t-post 418 comprises wings 403. Protruding from the wings 101 is a spine 106 that traverses the length of the t-post 108. The wings 403 are perpendicularly disposed to the spine 401.

The spine 401 slidably engages the slot 411. Thus, the slot 411 is configured to fixedly engage the spine 401 may sliding the spine 401 into the slot 411. Therefore, the support stud 407 is fixedly and rigidly coupled to the t-post 418.

Figure 5:
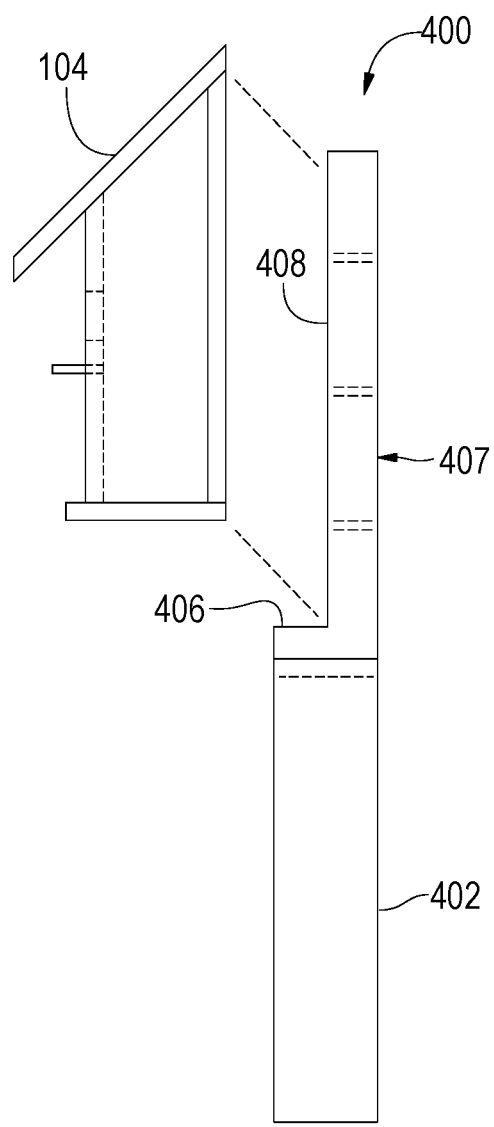
FIG. 5 is a side view of the t-post mount shown in FIG. 4.

FIG. 5 is a side view of the t-post mount 400 shown in FIG. 4. The t-post mount 400 comprises the support stud 407. The t-post mount 400 is configured to receive and support an implement, e.g., birdhouse 400 off the ground.

The t-post mount 400 comprises the support stud 407. The support stud 407 comprises a front flat surface 408 for receiving the implement being mounted on the t-post mount 400. Further, the support stud 407 comprises the ledge 406. The ledge 406 is configured for receiving the implement, e.g., the back, bottom edge of the birdhouse 104.

Further, the support stud 407 comprises a leg 402 that extends from the ledge 406. The leg 402 of the support stud 407 comprises a slot 411 (FIG. 4). The slot 411 extends from a bottom of the support stud 407 and terminates before reaching the ledge 406.

The t-post mount 400 further comprises the t-post 418 (FIG. 4). The t-post 418 comprises the spine 401 (FIG. 4) that extends the length of the t-post 418. The support stud 407 is coupled to the t-post 418 on a bottom end of the support stud 407. In this regard, the t-post 418 comprises wings 403 (FIG. 4). Protruding from the wings 403 is a spine 401 (FIG. 4) that traverses the length of the t-post 108. The wings 403 are perpendicularly disposed to the spine 401.

The spine 401 slidably engages the slot 411. Thus, the slot 411 is configured to fixedly engage the spine 401 may sliding the spine 401 into the slot 411. Therefore, the support stud 407 is fixedly and rigidly coupled to the t-post 418. Accordingly, the implement, e.g., the birdhouse, is fixedly and rigidly coupled to the t-post.

Figure 6:
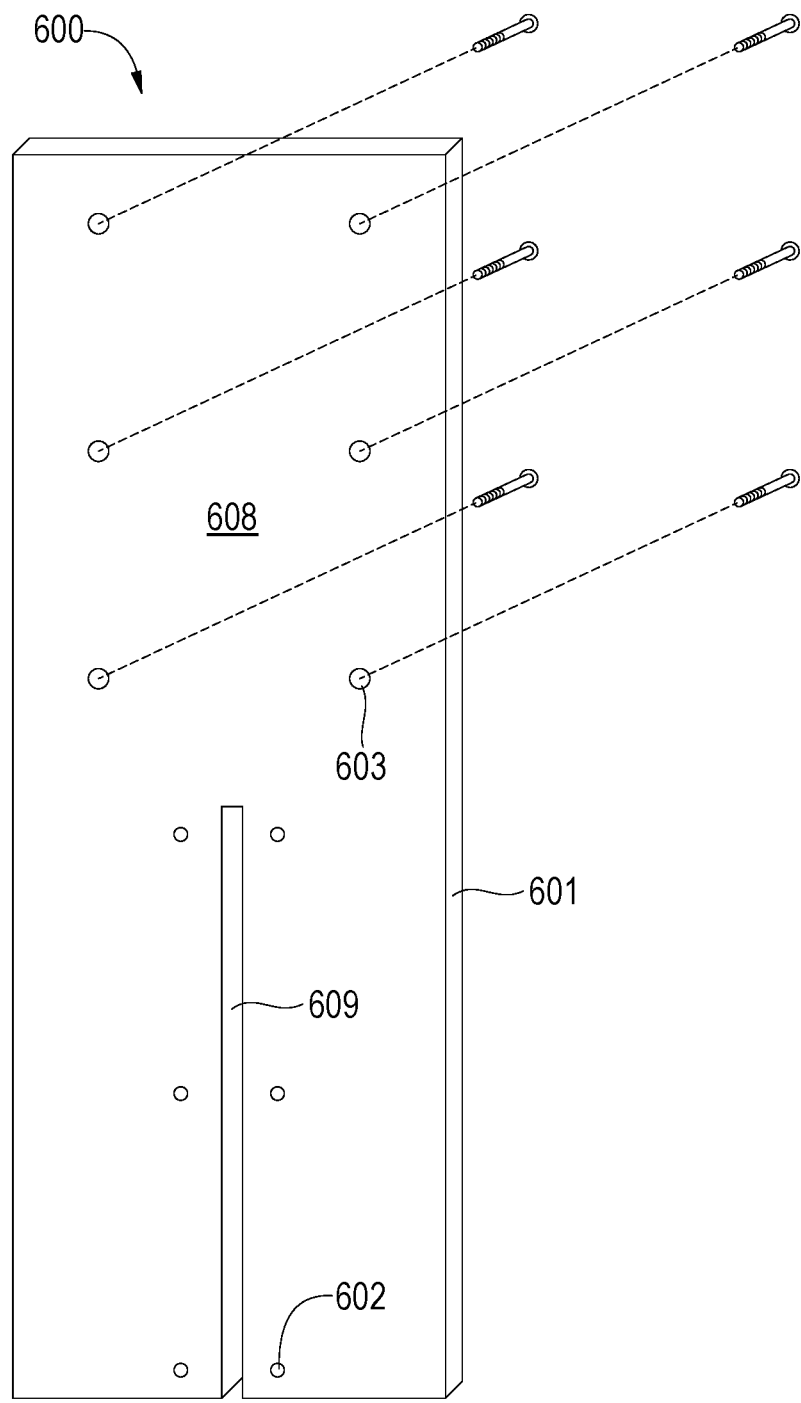
FIG. 6 is a front view of an exemplary support stud of FIG. 1.

FIG. 6 is a back view of an exemplary support stud 600 for use in the t-post mount 100 (FIG. 1). The support stud 600 is substantially rectangular. Note that the rectangular shape is merely one embodiment. The support stud 600 may be other shapes in other embodiments.

An implement, e.g., a birdhouse, sits flush with the front surface (not shown) of the support stud 600 above the slot 609 in the bottom section 601 of the support stud 600. Fasteners, e.g., nails or screws, are inserted through the openings 603 to attach the implement to the support stud 600. Further fasteners, e.g., wire ties, are inserted through openings 602 to attach the support stud 102 to the t-post 108 (FIG. 1). Notably, the wire ties that insert through openings 602 in the support stud 600, circle back around the support stud 600 and attach.

Figure 7:
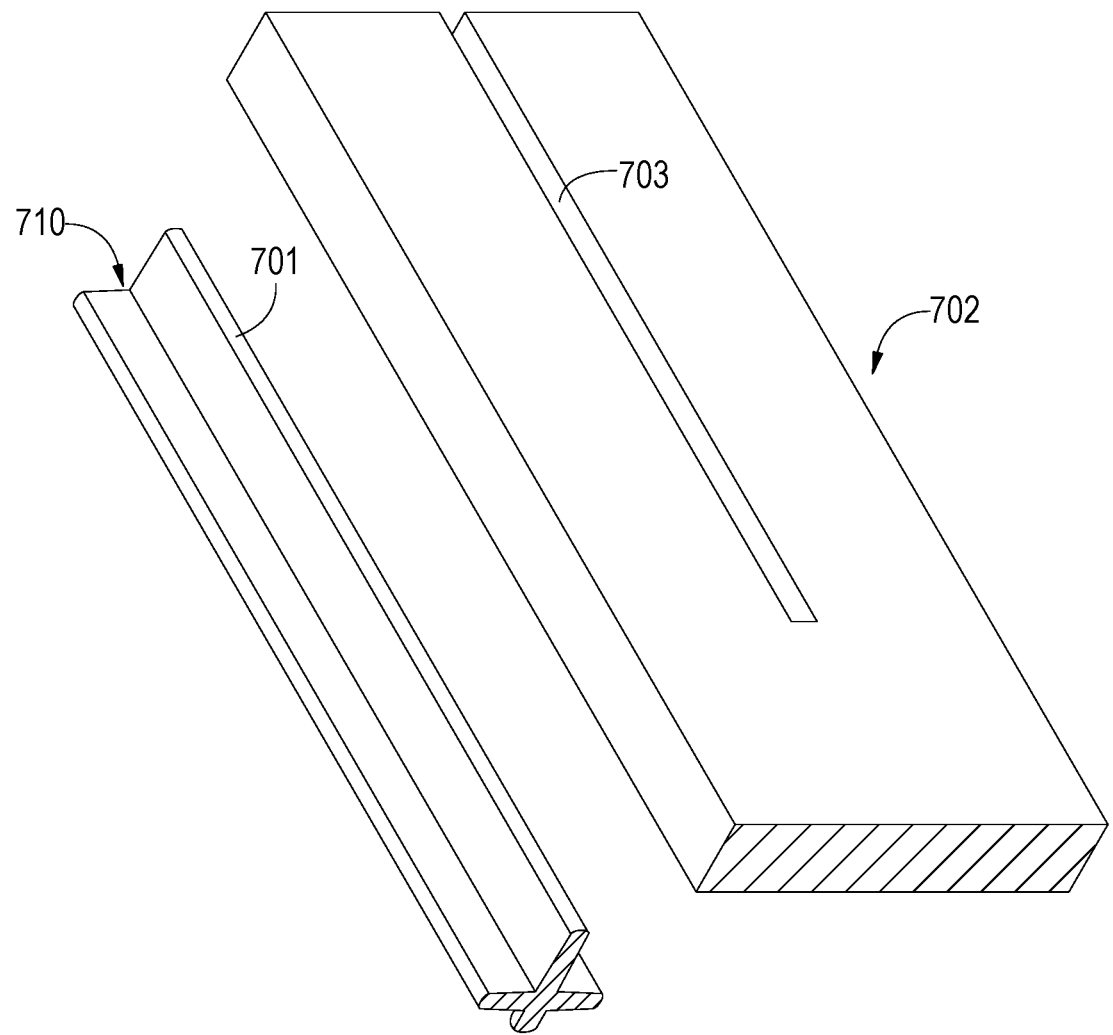
FIG. 7 is an exploded view of the support stud and the t-post of FIG. 1.

FIG. 7 is an exploded view of a support stud 702 and a t-post 710. The t-post 710 comprises a spine 701. Further, the support stud 702 comprises a slot 703. The slot 703 extends through the support stud 702 from a front of the support stud 702 to a back of the support stud 702. To couple to support stud 702 to the t-post 710, a user inserts the spine 701 in the slot 703 and slides the spine 701 upward until the slot 703 terminates.

Figure 8:
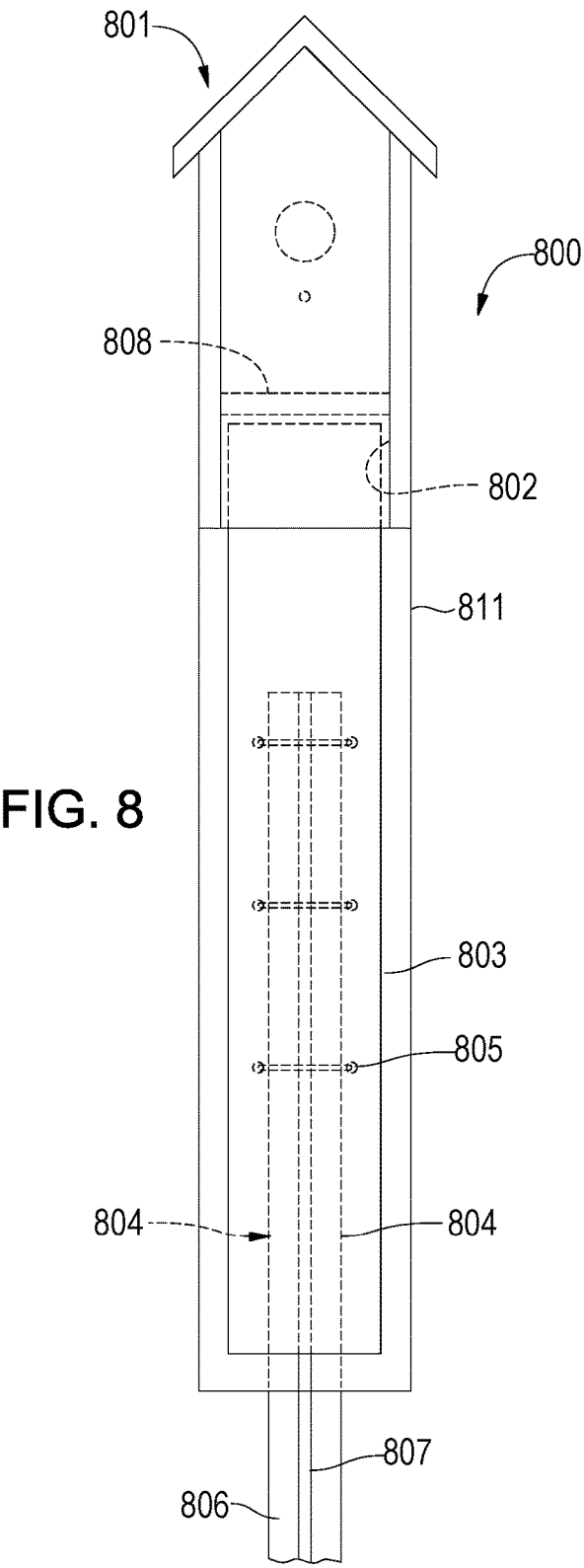
FIG. 8 is a front view of another embodiment of a t-post mount having a critter-resistant tube in accordance with an embodiment of the present disclosure.

FIG. 8 is a front view of another embodiment of a t-post mount 800 having a critter-resistant tube 803 installed therein in accordance with an embodiment of the present disclosure. The t-post mount 800 is configured to protect birds within the birdhouse from predators.

The t-post mount 800 comprises a support stud 811 that extends behind the birdhouse 801 (not shown but as shown in FIG. 3). The birdhouse 801 is coupled to the support stud 811 via fasteners, e.g., nails or screws. The support stud 811 further comprises a slot 813 that extends partially the length of the support stud 811.

In addition, the t-post mount 800 comprises a t-post 804. The t-post 804 comprises a spine 807 and wings 806. The spine 807 protrudes perpendicularly to the wings 806 outwardly.

The support stud 811 is fixedly and rigidly coupled to the t-post 804. In this regard, the spine 807 is slidably inserted into the slot 813. Once inserted, fasteners 805 are used to securely couple the support stud 811 to the t-post 804. Notably, the fasteners may be wire ties that insert through openings in the support stud 811, circle back around the support stud 811 and attach.

Note that the birdhouse 801 comprises a substantially square or rectangular cavity 802 underneath the bird housing, and the bird housing has a floor 808 therein. In addition to the support stud 811 and the t-post 804, the t-post mount 800 comprises a tubing 803. The tubing 803 is a hollow member. In one embodiment, the tubing 803 comprises a square or rectangular cross-section.

The tubing 803 is inserted within the opening 802 of the birdhouse 801. The tubing 801 is coupled to the support stud 811. When the tubing 803 is inserted within the opening 802 and coupled to the support stud 811, it is difficult, if not impossible, for a critter to gain access to wildlife contained within the birdhouse.

Figure 9:
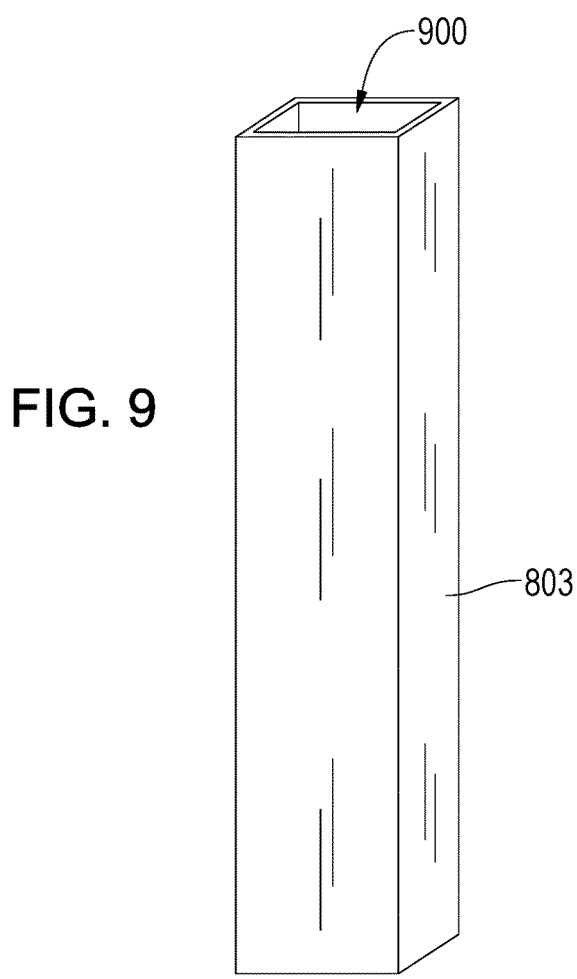
FIG. 9 is a perspective view of a critter-resistant tube of FIG. 8.

FIG. 9 is a perspective view of the tubing 803. In this regard, the tubing 803 is hollow having an opening 900 on one end and an opening (not shown) on the other end. The tubing 803 is placed in the opening 802 and secured to the support stud 811. If a critter were to climb up the t-post 804 and through the tubing 803, the critter would hit the bottom floor 808 of the bird housing. Thus, the critter would be unable to access the wildlife contained therein.

Note that each embodiment described referenced a t-post as the fencing article used. However, there are other types of posts that could be used with the present disclosure. For example, the post could be a U-post or a Y-post. In fact, any type of fencing that comprises a lineal protrusion that spans the length of the fencing article may be used.

In addition, in one embodiment, the support studs may be made of wood. However, the support studs may be made of other types of materials in other embodiments. For example, the support studs may be made of plastic, vinyl, or any other type of material.

The invention claimed is:

1. A post mount, comprising:
   a fence post having a protrusion that extends a length of the fence post; and
   a support stud comprising one or more openings for receiving one or more fasteners and comprising an implement attached to a top face portion of the support stud, the support stud further comprising a slot for slidably receiving the protrusion of the fence post, the slot opening at a bottom of the support stud and extending longitudinally vertically and terminating midway along the support stud, the slot going through the support stud from a front of the support stud and opening in a back of the support stud and configured to allow a top of the protrusion to be seated against the termination of the slot when the support stud is installed on the top of the fence post.

2. The post mount of claim 1, wherein the fence post is a t-post.

3. The post mount of claim 2, wherein the protrusion is a spine that extends the length of the fence post.

4. The post mount of claim 3, wherein the fence post comprises wings extending at a ninety-degree angle from the protrusion.

5. The post mount of claim 4, wherein the slot receives the spine.

6. The post mount of claim 1, wherein one or more fasteners coupled the support stud to the protrusion.

7. The post mount of claim 1, wherein the support stud comprises a flat surface above the slot.

8. The post mount of claim 7, wherein an implement is coupled to the flat surface of the support stud.

9. The post mount of claim 8, wherein the implement is a birdhouse.

10. The post mount of claim 1, further comprising fasteners that fit into the one or more openings of the support stud.

11. The post mount of claim 10, wherein the fasteners are wire ties.

12. The post mount of claim 1, wherein the support stud is coupled to a birdhouse via the one or more fasteners.

13. The post mount of claim 12, wherein the birdhouse comprises an opening on the underside of the birdhouse defined by a floor in the birdhouse.

14. The post mount of claim 13, wherein the opening is square.

15. The post mount of claim 13, wherein the opening is rectangular.

16. The post mount of claim 13, wherein a hollow tubing is inserted in the opening on the underside of the birdhouse.

17. The post mount of claim 16, wherein the hollow tube extends downwardly to or past the support stud.

* * * * *